Aug. 14, 1962  W. R. MARSHALL, JR  3,049,174
SPRAY DRYING APPARATUS
Original Filed May 14, 1953  2 Sheets-Sheet 1

Inventor:
William R. Marshall, Jr.
by his Attorneys
Howson & Howson

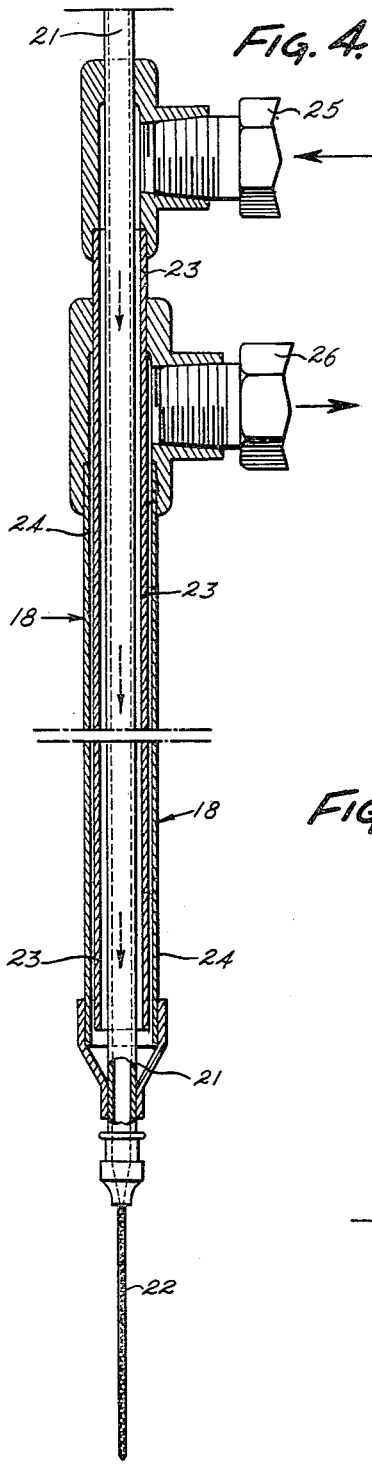
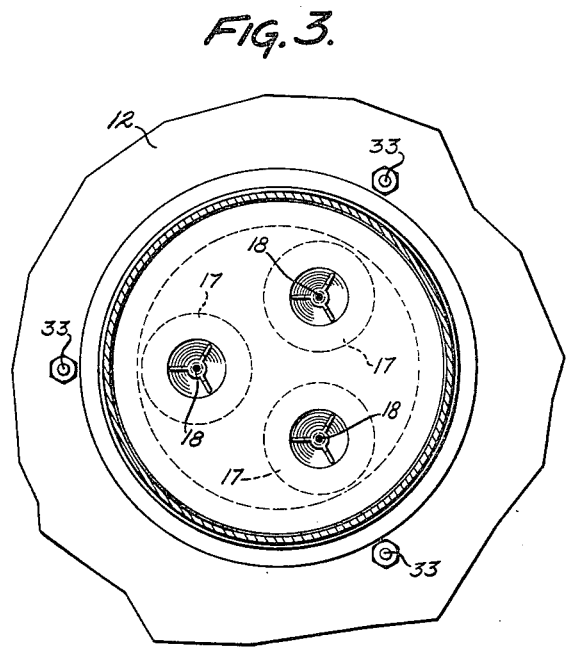
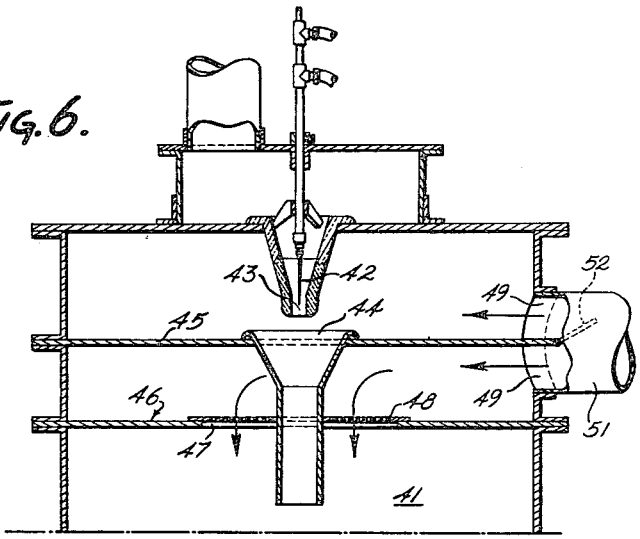

3,049,174
SPRAY DRYING APPARATUS
William R. Marshall, Jr., Madison, Wis., assignor, by mesne assignments, to Proctor & Schwartz, Inc., Philadelphia, Pa., a corporation of Pennsylvania
Original application May 14, 1953, Ser. No. 354,913, now Patent No. 2,880,794, dated Dec. 3, 1958. Divided and this application Feb. 10, 1958, Ser. No. 717,291
10 Claims. (Cl. 159—4)

The present invention relates to new and useful improvements in spray drying apparatus for drying aqueous emulsions to produce a dried product which may be reconstituted to its original emulsion form. More particularly the present invention relates to apparatus for spray drying certain synthetic resin aqueous emulsions of the type which cannot be dried by conventional methods.

This is a division of my copending application for Spray Drying Process filed May 14, 1953, and assigned Serial No. 354,913, now Patent 2,880,794.

For certain uses, synthetic resins of this type, and particularly certain resins of the vinyl group, are produced at the present time in the form of aqueous emulsions comprising particles of the resin having a size smaller than about 10 microns suspended in a vehicle, consisting largely of water with certain conditioning agents, in which the resin particles are substantially insoluble. Large quantities of these synthetic resin emulsions are used in the manufacture of paints and varnishes, in the manufacture of plywood as a cement or glue between the layers of wood veneer, and for many other uses. In most cases the total solids content of the emulsion is in the neighborhood of 50%–60% by weight so that on the basis of the solids content the cost of storing and shipping these emulsions is comparatively expensive. In addition, many of the emulsions are temperature sensitive and care must be exercised to protect them from damaging temperatures. Furthermore, the storage time is frequently a critical factor since the stability of these resin emulsions is limited and they must be used within a definite period of time after they are manufactured.

Accordingly, the desirability of producing from such a synthetic resin emulsion a dry product which can be reconstituted in emulsion form preparatory to use will be readily apparent. It will be obvious that the cost of shipping and storing the dry powdered product will be very much less than the cost of shipping and storing the emulsion form of the resin in which the resin constitutes a fraction of the weight of the emulsion. Furthermore, by producing a dry powder from these resin emulsions the problem of use of the emulsions within a specified period of time after initial manufacture no longer exists since the dry product need not be re-emulsified until it is to be used. In addition, the dry resin product is not as deleteriously affected by temperature conditions.

Prior to the present invention there has been no commercially practical and satisfactory apparatus for producing from synthetic resin emulsions of the present type a dry product which can be reconstituted into an emulsion having substantially the same physical and chemical properties as the original emulsion prior to drying.

With the foregoing in mind, the principal object of the present invention is to provide a novel apparatus for drying aqueous emulsions to produce a dry product which may be reconstituted in emulsion form having substantially the physical and chemical properties of the original emulsion from which the dry product was produced.

Another object of the present invention is to provide a novel apparatus for spray drying synthetic resin emulsions to produce a dry product in powdered form in which the particles when re-dispersed have a size which is of the order of the particle size in the original emulsion.

A further object of the present invention is to provide a novel apparatus for spray drying resin emulsions to produce a dry product which may be stored indefinitely and will not be adversely affected by normal storage and shipping temperature and other conditions.

One of the characteristics of certain synthetic resin emulsions of the present type which has hindered previous attempts to produce a satisfactory dry resin product is the fact that when dried they form a product which cannot be reconstituted as an emulsion. Accordingly a still further object of the present invention is to provide a novel apparatus for spray drying resin emulsions which effectively produces a dry product which can be reconstituted into an emulsion having substantially the same physical properties as the original emulsion prior to drying.

These and other objects of the present invention and the various features and details of the operation and construction thereof are hereinafter more fully set forth and described with reference to the accompanying drawings, in which:

FIG. 3 is a sectional plan view taken on line 3—3, FIG. 2 illustrating the general arrangement of the drying nozzles in the dryer housing;

FIG. 4 is an enlarged fragmentary sectional view of the apparatus used to inject a stream of the emulsion to be dried into the stream of drying medium, illustrating means for controlling the temperature of the emulsion;

FIG. 6 is a fragmentary longitudinal sectional view of the upper end of the dryer illustrating a modified arrangement for spray drying the emulsion.

Figure 1:
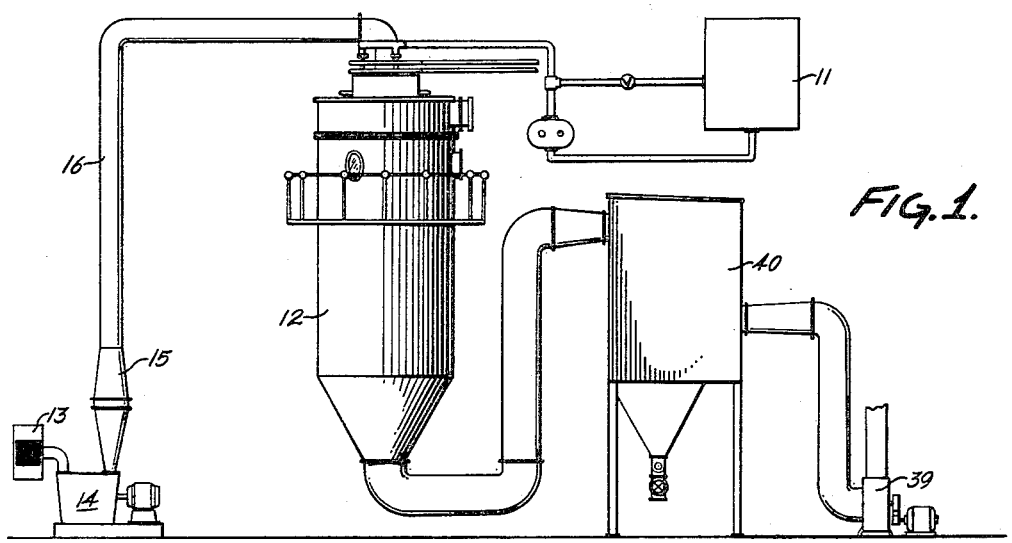
FIG. 1 is a schematic view of the general arrangement of equipment for spray drying in accordance with the present invention.
Figures 2, 5:
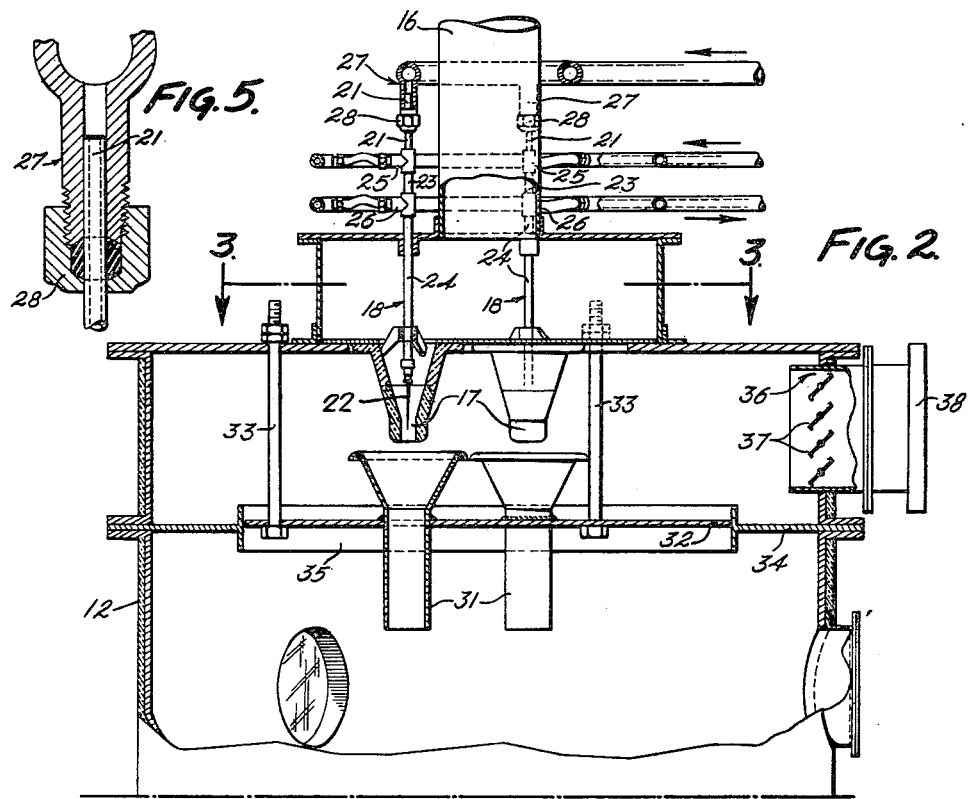
FIG. 2 is an enlarged fragmentary longitudinal sectional view of the upper end of the spray dryer illustrated in FIG. 1 showing one arrangement for atomizing and drying the material.
FIG. 5 is an enlarged longitudinal sectional view illustrating the means for adjustably securing the upper end of the inlet for the emulsion to the source of supply of the emulsion.

The present invention relates to a novel apparatus for spray drying synthetic resin aqueous emulsions to produce a dry powdered product which can be reconstituted as an emulsion having substantially the physical and chemical properties of the original emulsion from which the dried product is produced. In most cases this requires the production of a dry product having a particle size when re-emulsified of the order of the particle size in the original emulsion.

Certain synthetic resin emulsion of this type cannot be dried by conventional apparatus because the dry product cannot be reconstituted as an emulsion. One class of such emulsions is the aqueous emulsions of the vinyl resins such as, for example, the emulsions of polyvinyl acetate, polyvinyl chloride, polystyrene, polyvinyl butyral, polyvinyl propionate, polyvinyl butyrate, and vinylidene of vinyl chloride and vinyl acetate. In addition to the preferred class of synthetic resins set forth, apparatus of the present invention may be employed advantageously to spray dry other aqueous emulsions in which the solid particle size is about 20 microns or less and it is desired to produce a finely divided dry product having a dispersable particle size of the order existing in the original emulsion.

In any case, the dry product may consist of individual particles or clusters of individual particles having a size approaching the ultimate size of the particles in the original emulsion and which are readily redispersable in water, and by dispersable particle size as used in this specification and the claims is meant the ultimate size of the particles when redispersed in water.

Aqueous emulsions of the preferred class of resins set forth above generally have a particle size of less than 10 microns and are used extensively commercially as adhesives such as glues and cements and as paint and other protective coatings. In order to be able to re-emulsify the dry product obtained from these emulsions the dry product must have a dispersable particle size of the order of the particle size existing in the original emulsion.

Typical aqueous emulsions which, upon dilution as hereinafter described, can be spray dried to produce a dry synthetic resin product which may be reconstituted to an emulsion having substantially the properties of the original emulsion are those disclosed in U.S. Patent No. 2,444,396 dated June 29, 1948. Specifically the following emulsions have been been spray dried.

(A) A polyvinyl acetate emulsion having a viscosity of about 2000 centipoises at 20° C. and average particle size of about 3.5 microns; and manufactured under the name of Gelva SR-20A by the Shawinigan Products Corporation; and (B) A polyvinyl acetate emulsion having a viscosity comparable to that of emulsion A and an average particle size of about 1 micron; and manufactured under the name Gelva TS-30 by the Shawinigan Products Corporation.

The emulsions described above are particularly suitable for use as and in coating compositions which will not re-emulsify or deteriorate when immersed in water. In addition, these emulsions produce coatings which exhibit a high degree of resistance to abrasion and are characterized by their good properties of adhesion to surfaces to which they are applied.

According to the present invention the emulsion to be dried is discharged through a relatively small diameter orifice coaxially into and concurrently with a stream of a heated atomizing and drying gas traveling at a very high velocity. The high velocity of the atomizing and drying gas relative to the stream of the emulsion operates to break up the emulsion into very small droplets. The high velocity stream of drying gas and atomized emulsion become intimately mixed and enter a drying chamber where the drying of the atomized emulsion is completed. The dry particles are removed from the drying chamber and recovered in any suitable collector.

According to the present invention, the spray drying cycle employed to dry synthetic resin emulsion of the type described above comprises three general steps. These steps are: first, atomization of the emulsion; second, simultaneous mixing with the hot gases and drying of the atomized emulsion; and last, recovery of the dry product.

It has been determined that a solids content in the emulsion being atomized should be such as to give the product a viscosity of less than about 10 centipoises and is an important factor in producing a dry product of the desired small dispersable particle size. This appears to be due in part to the ability to obtain a finer atomization in an emulsion of lower viscosity and in part to the fact that there is a smaller amount of solid material in each atomized particle which means that the final product will be smaller when the water has been removed from the atomized particles. It is not economical to reduce the solids content of the emulsion to a very small percentage because of the higher evaporation load which would have to be carried by the dryer to remove all of the water from the emulsion. Accordingly, the optimum solids content of the emulsion will be at or near the maximum concentration which will still provide the desired viscosity for satisfactory atomization. In general, the solids content of the emulsion treated in accordance with the present method will not be above about 30% and more usually it will not be above about 25% by weight of the emulsion. In some cases, depending upon the particular material treated, the solids content may be as low as about 5%. For drying the particular polyvinyl acetate emulsions described, it is particularly advantageous that the solids content of the emulsion be within the range of about 12% to 25%.

The viscosity of any particular emulsion which it is desired to treat in accordance with the present method, if it is not already at the desired level as discussed above, can readily be adjusted by means well-known to those skilled in the art. For example, the preferred vinyl resin emulsions referred to above can be diluted with water to provide the desired viscosity. With these and other materials, the viscosity may also be adjusted by control of the temperature, agitation, and the like.

To atomize the emulsion the emulsion is discharged coaxially into and concurrently with a high velocity stream of an atomizing and drying gas. The emulsion is discharged as a fine stream through an orifice of small diameter positioned coaxially of the stream of the atomizing and drying gas in the direction of flow thereof. As it is discharged, the emulsion is broken up by the high velocity stream of the gas into very small droplets which are dried to form a finely divided dry product having the desired particle size characteristics. This is accomplished interiorly of a nozzle through which the atomizing and drying gas is caused to pass at a sub-sonic velocity in excess of about 400 feet per second, preferably in excess of about 700 feet per second. It has been determined that the ratio of atomizing gas to emulsion atomized should be in the range of about $10^3$ to $10^6$ cubic feet of gas per cubic foot of the emulsion, and that the diameter of the orifice should be in the range of 0.02" to 0.10".

The droplets of atomized emulsion are entrained and mixed in the drying gas with drying occurring simultaneously, and carried thereby through the nozzle and into the drying chamber where evaporation of the final moisture from the finely divided particles of the emulsion is effected. It is important that each droplet of the atomized emulsion be dried in a short period of time.

Care must be taken however to prevent decomposition of the material being dried. As a general proposition therefor, the temperature of the particles being dried must be maintained below the decomposition temperature of the particular material. During drying the evaporation of the moisture will take up heat, the exact amount of heat taken up depending upon the amount of moisture being evaporated. The actual temperature of the particles of the material being dried will thus depend upon the relative proportions of emulsion and of drying gas as well as on the relative temperatures thereof. Thus, the temperature of the incoming drying gas will be controlled with respect to the relative proportion of drying gas to emulsion, in accordance with principles well-known to those skilled in the art, to provide temperatures in the system conducive to optimum drying speed while maintaining temperatures in the material undergoing drying below that which would decompose or otherwise deleteriously affect that material. With synthetic resins in general, it is generally desirable to maintain the temperature of the resin particles below about 200° F. With the secific polyvinyl acetate emulsions described, it is particularly advantageous to maintain the temperature of the particles below about 140° F.

As stated above the temperature of the particles undergoing drying may be maintained below the decomposition point thereof by controlling the temperature of the incoming atomizing and drying gas with respect to the relative proportions of the gas to emulsion. The temperature of the particles, and of the system in general, may also be controlled at least in part by the introduction of secondary drying gas to the drying chamber. This secondary drying gas may be introduced into the drying chamber at one or more places, and the temperature thereof may vary widely depending upon the temperature of the high velocity stream of atomizing and drying gas referred to above and upon the other considerations referred to in the preceding paragraph. For example, sufficient heat for drying the emulsion being provided by the high velocity stream of atomizing and drying gas, a stream of relatively cool secondary drying gas may be introduced to the chamber. This not only serves to control temperatures within the chamber but also prevents any tendency of the emulsion particles to adhere to and to build up on the equipment. This secondary drying gas will also assist the drying process by providing additional gaseous medium for evaporating the moisture from the emulsion particles. On the other hand, this secondary drying gas, or a portion thereof, may be at a relatively high temperature so as to assist in drying, and this also has the advantage of increasing operating efficiency by reduction of the amount of atomizing and drying gas which must be supplied at relatively high pressure.

After the moisture has been evaporated from the finely divided solid particles of the emulsion in the drying chamber, the dry particles are removed from the drying chamber, separated from the drying gas and collected in any suitable collector.

The following specific examples give the operating conditions and results of typical runs employing the present apparatus to dry an emulsion preparation of polyvinyl acetate:

Example I

In this example emulsion "A" described above was diluted with water to a solids content of 16% and a viscosity of 1.76 cp.

Dryer conditions:
  Throat diameter, in. _____ 1.5
  Throat length, in. _____ 2.0
  Injector diameter, in. _____ 0.071
Operating conditions:
  Inlet gas temperature, °F. _____ 150
  Outlet gas temperature, °F. _____ 117
  Air rate, lbs./min. _____ 40.4
  Relative air velocity in throat, ft./sec. _____ 789
  Feed rate, gal./min. _____ 0.043

The resulting product had a moisture content of 1.35%, a bulk density of 21.3 lbs. per cubic foot and was readily reconstituted as an emulsion in water, the particles of which had a particle size on the same order as the original emulsion "A."

Example II

In this example emulsion "B" was diluted with water to a solid content of 14% and a viscosity of 1-2 cp.

Dryer conditions:
  Throat diameter, in. _____ 1.5
  Throat length, in. _____ 2.0
  Injector diameter, in. _____ 0.023
Operating conditions:
  Inlet gas temperature, °F. _____ 152
  Outlet gas temperature, °F. _____ 120
  Air rate, lbs./min. _____ 40.4
  Relative air velocity in throat, ft./sec. _____ 789
  Feed rate, gal./min. _____ 0.040

The resulting product was a white, free-flowing powder which was readily reconstituted with water into a polyvinyl acetate emulsion, the particles of which had a particle size on the same order as that of original emulsion "B."

With reference to the accompanying drawings there is illustrated one form of apparatus which may be used to dry the emulsions referred to above. The emulsion to be dried is placed in a vat or container 11 and is pumped out of the vat and injected into the throat of a converging nozzle 17. Simultaneously, an atomizing and a drying gas, preferably heated air, is caused to flow through the nozzle 17. The emulsion is broken up into small particles or atomized in the nozzle, and the atomized particles are entrained in and carried by the drying air through induction tubes 31 and into the drying chamber 12.

The air used for atomizing and drying the emulsion is drawn through an air filter 13 by means of a motor driven blower or compressor 14 and is passed through a suitable heating unit, for example as shown at 15 in FIG. 1, where it is heated to a predetermined temperature. The heated atomizing and drying air then passes through a duct 16 and is discharged into the nozzles 17 where it simultaneously atomizes and is thoroughly mixed with the emulsion.

The emulsion is injected into the atomizing and drying air interiorly of the nozzle 17 coaxially thereof and in the direction of flow of the air. To accomplish this, an injector 18 is mounted coaxially of each nozzle 17 and terminates inwardly of the throat portion of the nozzle so that the emulsion is injected and atomized in the throat of the nozzle.

With reference to FIG. 4 there is illustrated one form of injection device which may be used to discharge the liquid emulsion. This injector 18 consists of a central tubular member 21 having a small diameter outlet tube at the discharge end thereof, for example, having a bore diameter in the range of about 0.02 inch to about 0.10 inch. A pair of inner and outer concentric tubular jacket members 23 and 24, respectively, are positioned about the central tubular member 21 and are secured to inlet and outlet fittings 25 and 26, respectively. To control the temperature of the emulsion prior to atomization, a heating or cooling fluid may be passed through the inlet fitting 25 and downwardly along the length of the tubular member 21 to the bottom of the inner jacket 23, and upwardly between the inner and outer jackets 23 and 24 whence it is discharged through the outlet 26.

An important feature of the present invention is the provision of means for adjustably mounting the injectors 18 in the nozzles 17 to permit axial adjustment of the tip of the injector 22 with respect to the throat of the nozzles 17 in order to produce the most desirable conditions for atomization of the emulsion. To this end the upper portion of the tubular member 21 is received in an elongated T-shaped pipe fitting 27 which in turn is secured to the inlet pipe for the emulsion. A packing gland 28 is mounted at the lower end of the fitting 27 and after the tubular member is placed in its desired vertical position with respect to the nozzle 17, the gasket 28 is tightened to secure the injector in the set vertical position.

Adjustably mounted in coaxial alignment with each nozzle 17 is an induction tube 31 which extends into the drying chamber 12. Each of the induction tubes 31 are secured in a mounting plate 32 which may be supported in the drying chamber by means of a plurality of adjusting bolts 33, for example, as shown in FIG. 2 of the drawings. A dividing plate 34 having a circular flanged opening 35 of substantially the same diameter of the mounting plate 32 extends entirely across the drying chamber and the mounting plate 32 is mounted for vertical movement in the flanged opening 35 to permit adjustment of the tubes 31 with respect to the nozzles 17.

In a typical installation of the apparatus shown and described herein, very good results have been obtained with an injector 18 having an outlet tube 22 of a diameter of about 0.07 inch disposed coaxially in a nozzle 17 having a throat diameter of about 1.5 inches and length of about 2 inches and discharging into an induction tube 31 having a throat diameter of about 4 inches and a length of about 8 inches.

The induction tubes 31 are spaced from the nozzles 17 so that the flow of the atomizing and drying air through the nozzles may induce the flow of secondary air through the induction tubes and into the drying chamber 12. With reference to FIG. 2, an opening 36 is provided in the wall of the drying chamber 12 above the dividing plate 34 and adjustable louvres 37 are positioned across this opening 36 to control the amount of secondary air which is induced into the drying chamber 12. A filter 38 is placed across the opening 36 to filter the secondary air before it enters the drying chamber. If desired, a heating or cooling unit may be placed in this opening to control the temperature of the secondary air entering the drying chamber 12.

The atomized emulsion is dried substantially instantaneously and passes through the drying chamber 12 to a collector where the dried powder is separated from the drying air and collected. With reference to FIG. 1, a motor driven blower 39 draws the drying air and the dry product through a suitable collector 40 where the product is collected and then transferred to further handling apparatus (not shown).

FIG. 6 illustrates a modified form of drying apparatus. In this embodiment of the invention the emulsion to be atomized is injected through an injector 42 positioned interiorly of a nozzle 43, into a high velocity gas stream as previously described, and through an induction tube 44 into a drying chamber 41. Axially spaced plates 45 and 46 support the induction tube 44, and plate 46 has a relatively large central opening 47 therein in which is mounted a perforated plate or screen 48. Secondary air is induced or forced into the drying chamber 41 through an opening 49 in the side wall of the drying chamber which communicates both above and below the dividing plate 45. The secondary air is drawn into the drying chamber 41 through a duct 51 having a movable baffle 52 therein which may be selectively positioned to direct any desired proportion of air to either side of the dividing plate 45. The secondary air drawn into the drying chamber 41 above the dividing plate 45 is drawn through the tube 44 while the air which is drawn into the drying chamber 41 beneath the dividing plate 45 is passed through the perforated plate or screen 48.

In lieu of the single duct 51, it will be obvious that separate sources of secondary air may be supplied to opposite sides of the plate 45 and these separate sources of air may be controlled to different temperatures. For example, the secondary air introduced below the plate 45 may be cooler than that which is introduced above said plate 45 so that the drying chamber temperature may be maintained at a temperature sufficiently low to prevent adherence and buildup of still tacky particles on the walls of the equipment.

While particular embodiments of the present invention have been illustrated and described herein, it is not intended to limit the invention to such disclosures and it is contemplated that changes and modifications may be incorporated and embodied within the scope of the following claims.

I claim:

1. In spray drying apparatus, a housing having a drying chamber therein, a partition having an opening therein positioned across one end of the drying chamber, a nozzle mounted in said housing adjacent said opening, means to cause a stream of atomizing and drying gas to pass axially through said nozzle at high velocity, means to inject a thin stream of the material to be dried into the stream of gas, an induction tube carried by said partition coaxially with said nozzle having an outwardly flared end portion terminating in spaced relation with the nozzle, said tube having an open cylindrical portion extending through said partition into said drying chamber and operable to direct the gas and material discharged from said nozzle into the drying chamber, an opening in said housing outwardly adjacent said one end of the drying chamber through which secondary air may be drawn and directed through said tube into the drying chamber with the gas and material, a second partition positioned in said drying chamber about said induction tube in spaced parallel relationship with said first partition and having a plurality of small openings therein, and means to direct additional secondary air through said second partition into said drying chamber.

2. In spray drying apparatus, a housing having a drying chamber therein, a partition having an enlarged flanged opening therein positioned across one end of the drying chamber, a nozzle mounted in said housing adjacent said opening, means to cause a stream of atomizing and drying gas to flow axially through said nozzle at high velocity, means to inject a thin stream of the material to be dried into the stream of gas, a plate mounted in registry with the flanged opening in said partition, an induction tube carried by said plate coaxially with said nozzle operable to direct the gas and material discharged from said nozzle into the drying chamber, and means adjustably mounting said plate for relative movement toward and away from said nozzle to adjust the position of said tube with respect to the nozzle.

3. In spray drying apparatus, a housing having a drying chamber therein, a partition having an enlarged flanged opening therein positioned across one end of the drying chamber, a nozzle mounted in said housing adjacent said opening, means to cause a stream of atomizing and drying gas to pass axially through said nozzle at a high velocity, means to inject a thin stream of the material to be dried into the stream of gas, a plate mounted in registry with the flanged opening in said partition, an induction tube carried by said plate coaxially with said nozzle operable to direct the gas and material discharged from said nozzle into the drying chamber, means adjustably mounting said plate for relative movement toward and away from said nozzle to adjust the position of said tube with respect to the nozzle, and an opening in said housing outwardly adjacent said one end of the drying chamber through which secondary air may be drawn and directed through said tube into the drying chamber with the gas and material.

4. In spray drying apparatus, a housing having a drying chamber therein, a partition having an enlarged flanged opening therein positioned across one end of the drying chamber, a nozzle mounted in said housing adjacent said opening, means to cause a stream of atomizing and drying gas to flow axially through said nozzle at a high velocity, means to inject a thin stream of the material to be dried interiorly of said nozzle coaxially into and concurrently with the stream of gas, a plate mounted in registry with the flanged opening in said partition, an induction tube carried by said plate operable to direct the gas and material discharged from said nozzle into the drying chamber, means adjustably mounting said plate for relative movement toward and away from said nozzle to adjust the position of said tube with respect to the nozzle, and an opening in said housing outwardly adjacent said one end of the drying chamber through which secondary air may be drawn and directed through said tube into the drying chamber with the gas and material.

5. In spray drying apparatus, a housing having a drying chamber therein, a partition having an enlarged flanged opening therein positioned across one end of the drying chamber, a nozzle mounted in said housing adjacent said opening, means to cause a stream of atomizing and drying gas to flow axially through said nozzle at high velocity, means to heat said gas to a predetermined temperature prior to passage through the nozzle, means to inject a thin stream of the material to be dried interiorly of said nozzle coaxially into and concurrently with the stream of gas, a plate mounted in registry with the flanged opening in said partition, an induction tube carried by said plate coaxially with said nozzle having an outwardly flared end portion terminating in spaced relation with the nozzle, said tube having an open cylindrical portion extending through said plate into said drying chamber and operable to direct the gas and material discharged from said nozzle into the drying chamber; means adjustably mounting said plate for relative movement toward and away from said nozzle to adjust the position of said tube with respect to the nozzle, and an opening in said housing outwardly adjacent said one end of the drying chamber through which secondary air may be drawn and directed through said tube into the drying chamber with the gas and material.

6. In spray drying apparatus, a housing having a drying chamber therein, a partition having an enlarged flanged opening therein positioned across one end of the drying chamber, a nozzle mounted in said housing adjacent said opening, means to cause a stream of atomizing and drying gas to flow axially through said nozzle at high velocity, means to heat said gas to a predetermined temperature prior to passage through the nozzle, means to inject a thin stream of the material to be dried interiorly of said nozzle coaxially into and concurrently with the stream of gas, a plate mounted in registry with the flanged opening in said partition, an induction tube carried by said plate coaxially with said nozzle having an outwardly flared end portion terminating in spaced relation with the nozzle, said tube having an open cylindrical portion extending through said plate into said drying chamber and operable to direct the gas and material discharged from said nozzle into the drying chamber, means adjustably mounting said plate for relative movement toward and away from said nozzle to adjust the position of said tube with respect to the nozzle, an opening in said housing outwardly adjacent said one end of the drying chamber through which secondary air may be drawn and directed through said tube into the drying chamber with the gas and material, a second partition positioned in said drying chamber about said tube in spaced parallel relationship with said first partition and having a plurality of small openings therein, and means to direct additional secondary air through said second partition into said drying chamber.

7. Apparatus as claimed in claim 6 wherein means is provided to control the temperature of said secondary air and said additional secondary air.

8. In spray drying apparatus for spray drying material; an injector for the liquid material to be dried, means defining a passageway through said injector terminating in a straight section of uniform diameter through which the liquid material to be dried is adapted to pass, means to supply the liquid material to said injector and force the same through said injector continuously and discharge the said material at a predetermined velocity from the injector in the form of a thin continuous stream, a nozzle surrounding said injector having a generally circular outlet opening, means defining a passageway through said nozzle, said passageway having a straight section immediately upstream of the outlet opening of the nozzle of uniform diameter corresponding to the diameter of said outlet opening and of substantially greater diameter than the diameter of said injector passageway, said straight section of said nozzle passageway surrounding the straight section of said injector passageway and extending axially of said injector passageway for a substantial portion of its length with the straight section of said nozzle passageway terminating downstream of said straight section of said injector passageway, means to supply a primary drying gas to said nozzle in sufficient quantity to complete a substantial portion of the drying of said liquid material and force the primary drying gas through the straight section of said nozzle passageway at a predetermined velocity greater than the velocity of the liquid material discharged from said injector and in the same direction of travel as that of the said liquid material so that said primary drying gas is caused to atomize the said liquid material in said nozzle by virtue of the difference in velocity between said primary drying gas and said liquid material and simultaneously complete a substantial portion of the drying of said atomized liquid material in and adjacent to said nozzle.

9. Apparatus in accordance with claim 8 wherein means are provided spaced from the outlet opening of said nozzle to supply a secondary drying gas to the stream of primary drying gas and atomized liquid material to complete the drying of the atomized liquid material.

10. Apparatus in accordance with claim 9 wherein a chamber is provided to receive the primary drying gas and secondary drying gas and atomized liquid material, and wherein the means to supply the secondary drying gas comprises an induction tube positioned intermediate the outlet opening of said nozzle and said chamber.

References Cited in the file of this patent
UNITED STATES PATENTS

| 1,717,115 | McCann | June 11, 1929 |
| 1,757,573 | Heinrich | May 6, 1930 |
| 2,384,998 | Haugh | Sept. 18, 1945 |
| 2,561,393 | Marshall | July 24, 1951 |
| 2,561,395 | Marshall | July 24, 1951 |
| 2,730,170 | Bradford et al. | Jan. 10, 1956 |